United States Patent
Zhan et al.

(10) Patent No.: US 12,050,320 B2
(45) Date of Patent: Jul. 30, 2024

(54) DISPLAY DEVICE AND ELECTRONIC APPARATUS

(71) Applicants: University of Central Florida Research Foundation, Inc., Orlando, FL (US); Goertek Inc., Shandong (CN)

(72) Inventors: Tao Zhan, Orlando, FL (US); Jianghao Xiong, Orlando, FL (US); Guanjun Tan, Orlando, FL (US); Yun-Han Lee, Orlando, FL (US); Shin-Tson Wu, Orlando, FL (US); Sheng Liu, Santa Clara, CA (US); Jilin Yang, Santa Clara, CA (US)

(73) Assignees: University of Central Florida Research Foundation, Inc., Orlando, FL (US); Goertek Inc., Shandong (CN)

( * ) Notice: Subject to any disclaimer, the term of this patent is extended or adjusted under 35 U.S.C. 154(b) by 292 days.

(21) Appl. No.: 17/618,086

(22) PCT Filed: Feb. 21, 2020

(86) PCT No.: PCT/CN2020/076262
§ 371 (c)(1),
(2) Date: Dec. 10, 2021

(87) PCT Pub. No.: WO2020/169088
PCT Pub. Date: Aug. 27, 2020

(65) Prior Publication Data
US 2022/0299770 A1    Sep. 22, 2022

Related U.S. Application Data

(60) Provisional application No. 62/808,408, filed on Feb. 21, 2019.

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01)

(58) Field of Classification Search
None
See application file for complete search history.

(56) References Cited

U.S. PATENT DOCUMENTS 5,689,283 A   11/1997   Shirochi
6,061,103 A    5/2000   Okamura
(Continued)

FOREIGN PATENT DOCUMENTS

WO   WO2018/011285 A1   1/2018
WO   WO2019/203873 A1   10/2019

*Primary Examiner* — Phu Vu
(74) *Attorney, Agent, or Firm* — Baker Botts LLP

(57) ABSTRACT

A display device and an electronic apparatus are disclosed. The display device comprises: an image-display component, which generates an image light output, wherein at least one pixel light of the image light output has light polarization components of at least two polarization states or has a polarization light component of a polarization state and a non-polarization light component; and a polarization dependent image offset component, which receives the image light output coming from the image display component and deflects the polarization light components based on the polarization states to separate each of the at least one pixel light into at least two pixel lights, or deflects the polarization light component from the non-polarization light component to separate each of the at least one pixel light into at least two pixel lights.

10 Claims, 3 Drawing Sheets

(56) References Cited

U.S. PATENT DOCUMENTS

| | | | |
|---|---|---|---|
| 6,243,055 B1 | 6/2001 | Fergason | |
| 10,115,327 B1 * | 10/2018 | Lee | G09G 3/003 |
| 2019/0318706 A1 * | 10/2019 | Peng | G09G 3/007 |

* cited by examiner

DISPLAY DEVICE AND ELECTRONIC APPARATUS

CROSS-REFERENCE TO RELATED APPLICATIONS

This application is a National Stage of international Application No. PCT/CN2020/076262, filed on Feb. 21, 2020, which claims priority to U.S. Provisional Patent Application No. 62/808,408, filed on Feb. 21, 2019, both of which are hereby incorporated by reference in their entireties.

FIELD OF THE INVENTION

The present disclosure pertains to the technical area of a display device, and more specifically, to a display device and an electronic apparatus.

BACKGROUND OF THE INVENTION

Virtual reality is an emerging head-mounted display technology providing immersive 3D experience for users. The current angular resolution of the screens for these types of display devices is about 5 arcmins, which is far below human-eye acuity. The human-eye acuity is about 1 arcmin. This will cause severe screen-door effects.

One approach is to use panels with higher pixel density, which can maintain the field of view. However, display panels with ultra-high pixel density are very difficult to fabricate, especially for mass production. Moreover, the optical efficiency will be compromised because of the usually reduced aperture ratio.

There are several possible approaches to increasing pixel density without altering the display panel, most of which are realized through combining two offset display pixel matrices in the time domain. The offset could be achieved by birefringent crystal plates (U.S. Pat. Nos. 5,369,266 and 6,243,055 BI), rotation prism-array (U.S. Pat. No. 5,689,283 and 2004/0041784 A1) for projection system, and optical gratings (Yun-Han Lee, Tao Zhan, and Shin-Tson Wu, "Enhancing the resolution of a near-eye display with a Pancharatnam-Berry phase deflector," Opt. Lett. 42, 4732-4735 (2017)) for near-eye displays.

Through time-multiplexing (i.e., an original frame is divided into two or more sub-frames and assigned low-resolution images are displayed in each sub-frame with according offset), a display system with increased pixel density can be obtained. A common issue of time-multiplexing method is the sacrificed frame rate, which in turn could lead to image blurs especially for fast moving objects.

Moreover, there are other pixel-offset methods utilizing spatial multiplexing, such as a super-resolution display enabled by stacking LCD panels with offset pixels (F. Heide, D. Lanman, D. Reddy, J. Kautz, K. Pulli, D. Luebke, "Cascaded Displays: Spatiotemporal Superresolution using Offset Pixel Layers," ACM Transactions on Graphics, Vol. 33, No. 4, Article 60. (2014)). Although the device is able to work at the original frame rate, significant light loss is inevitable due to the low transmittance of LCD panels and the screen-door effect is more severe with the decreased aperture ratio.

SUMMARY OF THE INVENTION

One object of this disclosure is to provide a new technical solution for a display device.

According to a first aspect of the present disclosure, there is provided a display device, comprising: an image-display component, which generates an image light output, wherein at least one pixel light of the image light output has light polarization components of at least two polarization states or has a polarization light component of a polarization state and a non-polarization light component; and a polarization dependent image offset component, which receives the image light output coming from the image-display component and deflects the polarization light components based on the polarization states to separate each of the at least one pixel light into at least two pixel lights, or deflects the polarization light component from the non-polarization light component to separate each of the at least one pixel light into at least two pixel lights.

According to a second aspect of the present disclosure, there is provided an electronic apparatus, comprising a display device according to this disclosure.

According to an embodiment of this disclosure, a display resolution can be increased without altering a display panel of a display device.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION OF THE EMBODIMENTS

Figure 1:
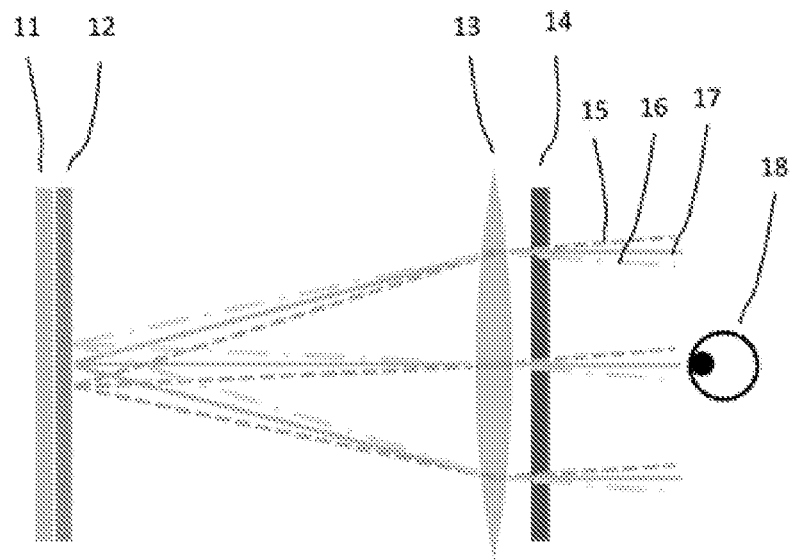
FIG. 1 is a top schematic plane view of an optical display system according to an exemplary embodiment of the disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the disclosure, its application, or uses.

Techniques, methods and device as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In this disclosure, it is proposed to use light polarization components to increase the resolution of a display device.

In one embodiment, a display device comprises: an image-display component, which generates an image light output, wherein at least one pixel light of the image light output has light polarization components of at least two polarization states; and a polarization dependent image offset component, which receives the image light output coming from the image-display component and deflects the polarization light components based on the polarization states to separate each of the at least one pixel light into at least two pixel lights.

In this manner, one pixel of the image-display component such as a display panel can produce at least two pixels for display to a viewer. This effect can be achieved through optical devices, without the digital image processing, which will save the computing resources and lower the processing and image generating requirements.

In an example, the at least one pixel light further has a non-polarization light component, and the polarization dependent image offset component deflects the polarization light components and the non-polarization light component to separate each of the at least one pixel light into at least three pixel lights. In such a manner, the resolution can further be increased.

In another embodiment, a display device comprises: an image-display component, which generates an image light output, wherein at least one pixel light of the image light output has a polarization light component of a polarization state and a non-polarization light component; and a polarization-dependent image offset component, which receives the image light output coming from the image-display component and deflects the polarization light component from the non-polarization light component to separate each of the at least one pixel light into at least two pixel lights.

In this embodiment, the original light path will be kept and only one polarization light component is required. As such, the requirement of generating a polarization light component is lowered.

The image-display component may further comprises: an image-generating component, which generates a raw image light output; and a polarization modulation component, which modulates at least one pixel light of the raw image light output to have the at least two polarization states. For example, the image-generating component is an LCD display panel, an OLED display panel, a mini-LED enabled LCD display panel, a LCoS display panel, a micro-LED display, a fiber scanning display panel, or a QLED display panel. For example, the LCD display panel is a twisted nematic LCD display panel, an in-plane-switching LCD display panel or a vertical alignment LCD display panel.

In an example, the polarization modulation component is a polarization modulation layer attached to a light emitting plane or image plane of the image-generating component.

The polarization modulation component may be pixelated. The polarization modulation component can have the same pixel density as the image-generating component.

The polarization modulation component may be programmably activated based on the pixels of the image light output. For example, areas on the polarization modulation component corresponding to black pixels of the image light output may be inactivated.

The polarization modulation component may be an active-driving polarization modulation device that can change the polarization state of light incoming from the image-generating component. For example, the polarization modulation component is a liquid crystal device. For example, the polarization modulation component is a twist-nematic LC panel.

In an example, the polarization modulation component independently modulates the polarization states of red, blue and green sub-pixels of the raw image light output.

The display device in various embodiments can further comprises a lens unit, which is disposed after the image-display component and adjusts the image light output. For example, the lens unit includes at least one of a plano-convex lens, a biconvex lens, an aspheric lens, and a Fresnel lens. The lens unit may be disposed between the image-display component and the polarization dependent image offset component, or is disposed optically behind the polarization dependent image offset component. The impact of the lens unit on the polarization states of the image light output is predetermined.

The image-display component may be an LCD display panel, an OLED display panel, a mini-LED enabled LCD display panel, an LCoS display panel, a micro-LED display, a fiber scanning display panel, or a QLED display panel. The LCD display panel may be a twisted nematic LCD display panel, an in-plane-switching LCD display panel or a vertical alignment LCD display panel.

The polarization dependent image offset component is a diffractive polarization grating, for example, a liquid crystal diffractive polarization grating or a crystal diffractive polarization grating.

The polarization dependent image offset component may have a mono-layer structure with spatial-varying anisotropy or a multi-layer structure with spatial-varying anisotropy.

The polarization dependent image offset component may have a periodicity determined by the pixel pattern to be displayed.

The polarization dependent image offset component can deflect each of the at least one pixel light into light beams propagating along 2 or 3 directions, simultaneously.

The polarization dependent image offset component assigns desired intensities to the deflected light beams. The desired intensities of the deflected light beams are different. In some situations, this approach with give a viewer a feeling that the display is bright.

In another example, the light intensities in the polarization light components and/or the non-polarization light component of each of the at least one pixel light are equal.

The polarization light components of at least two polarization states include right-handed circularly polarized light component and left-handed circularly polarized light component, and the polarization dependent image offset component deflects the right-handed circularly polarized light component and the left-handed circularly polarized light component into opposite directions.

The display device according to various embodiments may comprises a supporting framework for supporting components in the display device.

The image light output generated by the image-display component is linearly polarized light.

The display device according to various embodiments may comprises a processing component. The processing component changes an original image data with higher resolution to a display image data with lower resolution and sends the display image data to the image-display component for generating the image light output. As such, the processing requirements of the image-display component may be lowered. This could lower the cost and power consumption of the image-display component, while keeping similar display resolution.

the processing component may include a processor and a memory, the memory stores instructions and the instructions control the processor to changes the original image data to the display image data.

The processing component may be a digital signal processing device.

The processing component may generate the display image data by factorizing the original image data. The processing component may factorize the original image data by the linear least square algorithm for displays with large open aperture ratio.

The processing component factorizes the original image data by direct sampling algorithm for displays with small open aperture ratio.

The displayed image coming from the polarization dependent image offset component has a resolution higher than that of the display image data and is displayed simultaneously.

The displayed image coming from the polarization dependent image offset component works at the original frame rate of the original image data.

The display image data are encoded in the retardation of pixels in the polarization modulation component.

In this disclosure, an electronic apparatus is also provided, which comprises a display device according to various embodiments. The electronic apparatus may be a head-mounted electronics apparatus. The electronics apparatus may be a virtual, augmented, or mixed reality electronics apparatus.

In this disclosure, the display device includes an image-display component, which may include an information display (image-generating) component and a polarization modulation layer. The display device further comprises a polarization dependent image offset optical element and a lens unit. By controlling the polarization state of each pixel through a polarization modulation layer, each display pixel can be separated into two pixels by a certain portion with a desired angular distance. Thus, the apparent pixel density is increased, and the screen-door effect as observed by the users can be greatly reduced.

In the display device, the display pixel grid can be optically duplicated and offset by a portion of a pixel width, such that the pixel density is increased.

The display device can be an optical image display/view system in an electronic apparatus, such as a phone, a head-mounted electronics apparatus and so on. In an exemplary, the electronic apparatus may include a support structure that can be wearable by a viewer. The image-generating component of the image-display component of the display device is adapted to generate an image output. The polarization modulation component of the image-display component is imposed to accept the polarized image output and adapted to control the polarization of each pixel electrically. A lens unit may be disposed to magnify and collimate the image-generating component. The polarization dependent image offset component is disposed to accept the collimated image output.

The image output may be polarization-modulated in the pixel level. The image offset component is a polarization grating.

FIG. 1 schematically illustrates a display device. The display device comprises an image-generating component 11 that is attached with a polarization modulation layer 12 and is optically followed by a lens 13. Then, the lens 13 is followed by an image offset component 14. The displayed image then enters eyes 18 of a viewer.

The image-generating component 11 can be an OLED display, mini-LED enabled LCD display, a LCoS display, a micro-LED display, a fiber scanning display, or another display components as known in the art. For example, the image-generating component 11 outputs or is adapted to output a polarized light (virtual) image. Typically, display components such as LCD and LCoS displays produce polarized outputs. If the display output is not inherently polarized, as produced by, e.g., a micro-LED display, an OLED display, or a fiber scanning display, a polarizer, a reflective polarizer will advantageously be disposed on the output side of the image-generating component 11 as known in the art to effect a desired polarization state image output.

The polarization modulation component 12 can be easily adapted from a twist-nematic LC panel or other active-driving polarization modulation devices that could change the polarization state of incoming light from each pixel independently in component 11.

The lens 13 can be a piano-convex lens, a biconvex lens, an aspheric lens, a Fresnel lens or a hybrid kind of above. This lens 13 serves to magnify and project the display image to a proper viewable distance. For example, in the situation of a head-mounted viewing device, the distance is preferably in the range from 0 to 3 diopters.

The polarization dependent image offset component 14 is preferably a liquid crystal diffractive polarization grating, which may be similar to that disclosed in [Svetlana Serak, Nelson Tabiryan, and Boris Zeldovich, "High-efficiency 1.5 μm thick optical axis grating and its use for laser beam combining," Opt. Lett. 32, 169-171 (2007)]. It can serve to generate the pixels offset 15, 16, 17. The light rays from a pixel on the image-display component 11, 12 are directly collimated by lens 13. With polarization dependent image offset component 14, the light rays from a single pixel will be separated by a small angle in opposite directions (15, 16), and thus generating two apparent pixel matrix for the viewer 18. In some situation, a light ray in direction 17 will be also left to generate further pixels for the viewer 18.

Figure 2:
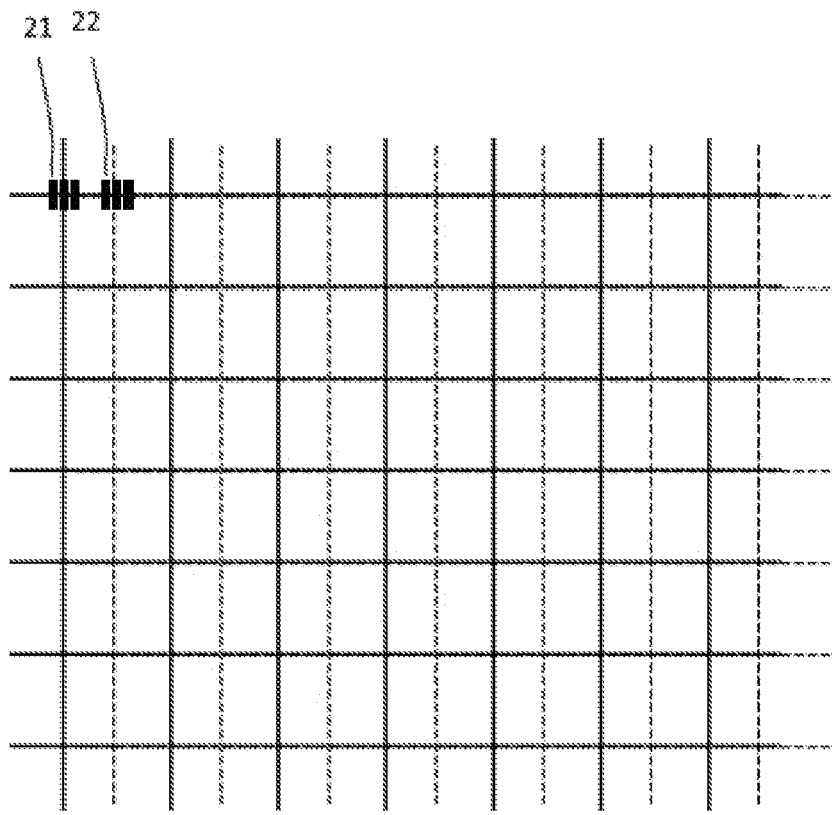
FIG. 2 is a sketch for one possible shifting direction of pixels.
Figure 3:
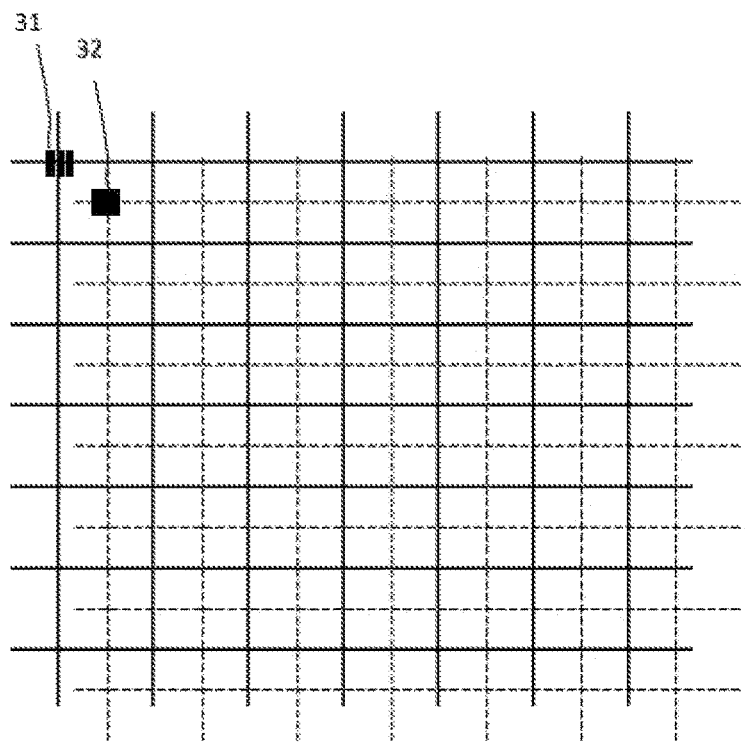
FIG. 3 is a sketch for one possible shifting direction of pixels.

If the display device has an original angular pixel size $d\theta$, this shift can be set so that pixels all move vertically or horizontally by half angular size (move $d\theta/2$), such as the case shown in FIG. 2. FIG. 2 only shows the case of shifting in horizontal direction, but the same applies to vertical shifting. By changing the polarization state through polarization modulation layer 12, a single pixel could be optically separated into 2 pixels (21, 22) with a desired separation ratio subject to the modification from the polarization modulation layer 12. This shift can also be set to move pixels diagonally (45° with respect to the unit pixel) by approximated by $\sqrt{2} \times d\theta/2$ as shown in FIG. 3. By changing the polarization state through the polarization modulation layer 12, a single pixel could be optically separated into 2 pixels (31, 32) with the desired separation ratio in subject to the modification from the polarization modulation layer 12. Through the modulation of the polarization, spatial separation and shifting of the pixels with desired brightness can be realized. Equivalently, there are two virtual panels, with opposite spatial shift, being displayed to the viewer simultaneously. By dividing one high-resolution images into two low-resolution images and assign these two images to the two virtual panels accordingly, a high-resolution image could be displayed for the observer 18.

Figure 4:
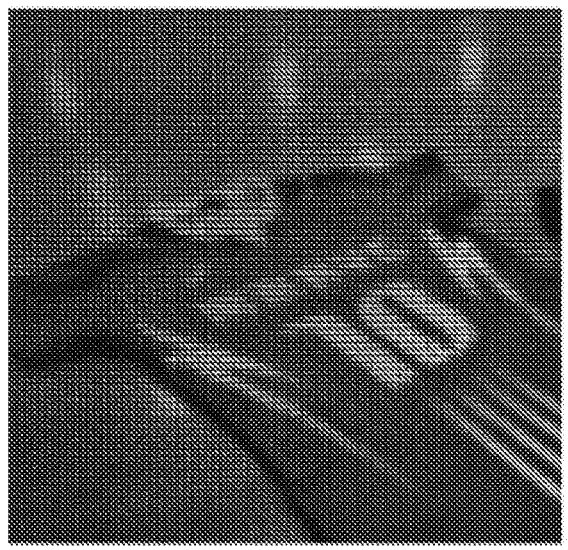
FIG. 4 is a preliminary experimental result of device exploiting resolution enhancement technique disclosed in this patent.
Figure 4:

FIG. 4 is a preliminary experimental result of a display device according to an embodiment. FIG. 4(a) shows the display image without pixel density enhancement and FIG. 4(b) shows the display image with pixel density enhancement. The detailed texture is visible in FIG. 4(b) after pixel density enhancement.

Figure 5:
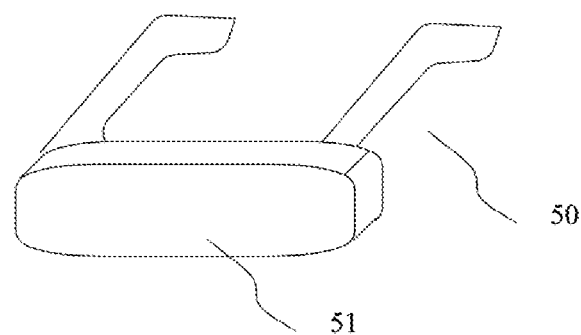
FIG. 5 is a schematic diagram of an electronic apparatus according to various embodiments.

FIG. 5 is a schematic diagram of an electronic apparatus according to various embodiments. The electronic apparatus 50 includes a display device 51 as described above. The electronic apparatus 50 may be a projector, a television, a computer, a wearable display device such as a virtual reality device, an augmented reality device or a mixed reality device.

Although some specific embodiments of the present disclosure have been demonstrated in detail with examples, it should be understood by a person skilled in the art that the above examples are only intended to be illustrative but not to limit the scope of the present disclosure.

The invention claimed is:

1. A display device, comprising:
an image-display component adapted to generate an image light output, wherein at least a portion of the image light output corresponding to at least one pixel comprises either light having at least two polarization states or light having a polarization state and unpolarized light; and
a polarization dependent image offset component, optically coupled to the image-display component and adapted to receives the image light output therefrom and either (a) deflect the light having the at least two polarization states based on the polarization states to separate the image light output into light corresponding to at least two pixel, or (b) deflects the light having a polarization state from the unpolarized light to separate the image light output into light corresponding to at least two pixels,
wherein the image-display component further comprises:
an image-generating component, adapted to generates a raw image light output; and
a polarization modulation component, adapted to modulate the raw image light output corresponding to at least one pixel to have the at least two polarization states.

2. The display device according to claim 1, wherein the light corresponding to at least one pixel has light polarization components of at least two polarization states and an unpolarized light component, and the polarization dependent image offset component is adapted to deflects the polarization light components and the unpolarized light component to separate the image light output into light corresponding to at least three pixels.

3. The display device according to claim 1, wherein the polarization modulation component is programmably activated based on the at least one pixel of the image light output.

4. The display device according to claim 1, wherein the polarization modulation component includes areas corresponding to black pixels of the image light output that are inactivated.

5. The display device according to claim 1, wherein the polarization modulation component is an active-driving polarization modulation device adapted to change the polarization state of light incoming from the image-generating component.

6. The display device according to claim 1, wherein the polarization dependent image offset component is adapted to deflect the light corresponding to at least two pixels into light beams simultaneously propagating along 2 or 3 directions, and the polarization dependent image offset component is adapted to assign different intensities to the deflected light beams.

7. The display device according to claim 1, wherein a displayed image coming from the polarization dependent image offset component works at the original frame rate of the original image data.

8. The display device according to claim 1, further comprising: a processing component, wherein the processing component is adapted to change an original image data having a higher resolution to a display image data having a lower resolution and sends the display image data to the image-display component for generating the image light output.

9. An electronic apparatus, comprising a display device according to claim 1.

10. The display device according to claim 8, wherein a displayed image coming from the polarization dependent image offset component works at an original frame rate of the original image data and has a resolution higher than that of the display image data.

* * * * *